No. 781,255.

Patented January 31, 1905.

UNITED STATES PATENT OFFICE.

FRANK A. WIDDOWS, OF STOCKTON, CALIFORNIA.

FIRE-BRICK.

SPECIFICATION forming part of Letters Patent No. 781,255, dated January 31, 1905.

Application filed May 12, 1904. Serial No. 207,681.

*To all whom it may concern:*

Be it known that I, FRANK A. WIDDOWS, a citizen of the United States, and a resident of the city of Stockton, county of San Joaquin, State of California, have invented a new and useful Improvement in Fire-Brick, of which the following is a full, clear, and sufficient specification.

My invention has reference to the art of preparing fire-brick composed of such ingredients in certain proportions as will be hereinafter shown, so as to render such bricks, in effect, practically indestructible against the direct application of intense heat to such prepared brick.

I first prepare a vehicle as follows: To a proportion of my entire formula of about ten per cent. of dry fire-clay previously pulverized I add water sufficient to render the mixture plastic. I then add a proportion of about fifteen per cent. of thoroughly-pulverized charcoal and a proportion of about seventy-five per cent., thoroughly pulverized, of the metal known as "chromium" or, in trade parlance, as "chrome." The fire-clay, charcoal, and chromium, as will be seen by the above description, constitute my complete formula and having thus been combined are then well stirred and readily unite. I then mold the mixture into plastic masses of any desired size and dry the same in the sun or drying-chamber in order that the water, hygrometrically combined with the clay, may be driven away or absorbed by the atmosphere. When this is accomplished, the product is placed in the burning clamps or kilns, at which stage of preparation the action of the heat drives off the chemically-combined water or moisture. The charcoal forms carbon dioxid and escapes in fumes, leaving the fire-clay and chromium in permanent and joint combination, the departure of the charcoal rendering the bricks porous to such a degree as to permit the equitable distribution of heat produced within a furnace or similar structure, of which my improved fire-brick forms the inclosure in whole or in part.

Chromium being a hard brittle metal is held intact in position in my improved fire-brick by reason of the tenacious nature of its companion ingredient, fire-clay, and its own nature being difficult of fusion resists to a superlative degree the action of intense heat in furnace, kilns, and the like.

I do not claim any general rule as to the quantities of ingredients to be used in the preparation of my improved fire-brick, as that must necessarily depend upon the class of fire-clays or brick earths used; but in pure clays, consisting chiefly of alumina and silica, the percentage of proportions I have narrated is recommended. If desired for the purposes of ornament, my method of producing indestructible fire-brick permits of the introduction into its composition of lime, hydrated oxid of iron, and other ingredients, thus producing different desired colors; but I make no claim to such admixture, but confine myself to the original ingredients as herein first set forth and the reactions caused during the various stages of the preparation of my improved fire-bricks caused by the departure of the water and charcoal. Another use to which the composition of matter forming my improved fire-brick may be applied is that of applying the same in its general mass when prepared for molding into brick directly to the sides, top, and bottom of the interior of furnaces and the like as a plaster. As before stated, I do not desire to limit myself to the precise proportion of the ingredients as hereinbefore described, as it is evident that the same may be varied without departing from the spirit of my invention.

I usually employ in the construction of my improved fire-brick the form of a parallelopipedon—say about nine inches long, five inches broad, and four inches thick; but I do not limit myself to any stated size or shape. It is I claim thus comprehensively shown that the composition of, together with the method of preparing, my improved fire-brick renders the finished product indestructible to the highest degree and having capacity to resist fusion even when subjected to the severest test of the direct application of heat produced by the combustion of anthracite coal or petroleum, either crude or in its various refined forms.

Having thus described my invention, I claim—

1. As a new article of manufacture a fire-brick composed of fire-clay, charcoal and chromium substantially in the proportions specified.

2. The art or process of preparing fire-brick consisting of pulverizing fire-clay, mixing it with water, adding pulverized charcoal and pulverized chromium, mixing same, forming the compound into plastic masses, drying such masses, and then subjecting the same to the action of a proper degree of heat, substantially as shown.

3. In a fire-brick, the combination substantially as shown of a proper proportion of pulverized fire-clay and pulverized charcoal with pulverized chromium, in about the proportions specified.

4. The combination, in plastic masses, of pulverized moist fire-clay, and pulverized charcoal, with pulverized chromium, for the purposes specified.

5. An indestructible fire-brick composed of moist pulverized fire-clay, pulverized charcoal and pulverized chromium stirred together, the mixture formed into plastic masses, such masses then being subjected to the action of a dry atmosphere, and of fire substantially as shown.

In testimony whereof I have signed my name to this specification in the presence of two subscribing witnesses.

FRANK A. WIDDOWS.

Witnesses:
PERCY S. WEBSTER,
JOSHUA B. WEBSTER.